Nov. 4, 1969 L. W. HARTZEL 3,476,526
PROCESS FOR RECOVERING FILLER FROM ELASTOMER
Filed May 12, 1967
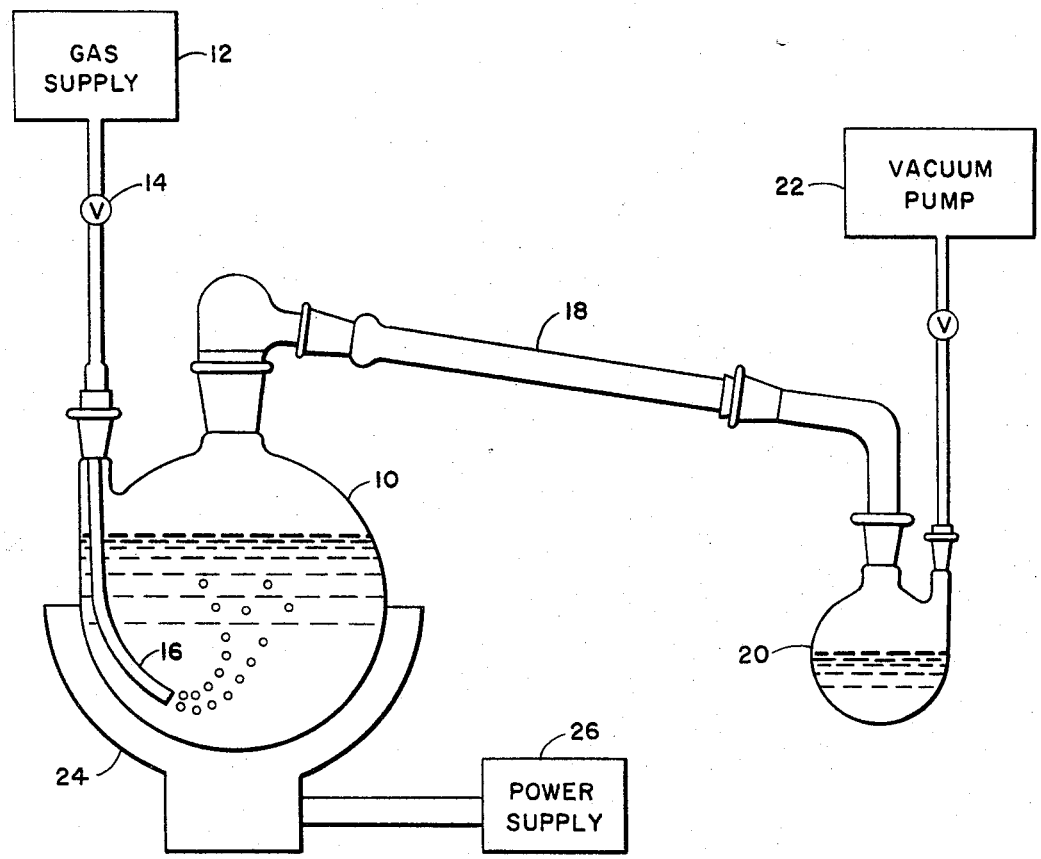
Lawrence W. Hartzel
*INVENTOR.*
BY

United States Patent Office 3,476,526
Patented Nov. 4, 1969

3,476,526
PROCESS FOR RECOVERING FILLER FROM ELASTOMER
Lawrence W. Hartzel, Dayton, Ohio, assignor to the United States of America as represented by the United States Atomic Energy Commission
Filed May 12, 1967, Ser. No. 639,597
Int. Cl. B01f *9/22, 9/00*
U.S. Cl. 23—312                                                9 Claims

ABSTRACT OF THE DISCLOSURE

A process for recovering filler material from an elastomer matrix by decomposing the elastomer matrix at a high temperature in a high boiling organic liquid plasticizer having a stable low vapor pressure and low viscosity at the operating temperature and separating and cleaning the residue from the reaction mixture.

BACKGROUND OF INVENTION

There are many applications for elastomers having either organic or inorganic fillers within the elastomer matrix to provide a desired property or properties. One such application is in the nuclear field where various metal fillers, such as lead, cadmium, and boron, may be used as fillers in an elastomer matrix for reactor shielding. It is sometimes desirable to recover the filler, especially if the filler is relatively expensive or difficult to produce or procure, from filled elastomer matrix surplus materials or scrap remaining from some machining, or the like, operation on the elastomer material. This is particularly desirable in the case of boron since it is expensive to produce in its pure form.

Previous methods for recovering boron filler from an elastomer matrix are unsatisfactory for a number of reasons. Since some recovery processes were aerobic processes and since boron and some other filler materials oxidize readily in air at room temperatures, it is not generally feasible to recover these materials in their pure, unreacted state with these processes. Other processes fail to recover large enough quantities of pure filler material while others presented a hazard to personnel by releasing combustible gases. Other processes cause the elastomers to disproportionate and it is difficult to dispose of the high molecular weight disproportionation products.

SUMMARY OF INVENTION

In view of the above, it is an object of this invention to provide a novel method for recovering a filler material from an elastomer matrix loaded with the material.

It is a further object of this invention to provide a method for recovering an easily oxidizable filler material in its pure, unreacted state from an elastomer matrix loaded with the material.

It is a further object of this invention to provide a method for recovering boron filler material from an elastomer matrix loaded with boron.

Various other objects and advantages will appear from the following description of the invention, and the most novel features will be particularly pointed out hereinafter in connection with the appended claims.

The invention comprises a method for recovering a filler material from an elastomer matrix by mixing minced elastomer loaded with the material with a stable, low vapor pressure and low viscosity organic plasticizer, heating the mixture under a vacuum in an inert gas atmosphere to a temperature to induce distillation and decomposition of a predetermined portion of said elastomer mixture, cooling the reaction mixture and separating the residue from the reaction mixture.

DESCRIPTION OF DRAWINGS

The present invention is described in the accompanying drawing which illustrates in more or less diagrammatic form suitable apparatus for performing the method of this invention.

DETAILED DESCRIPTION

The drawing illustrates an apparatus which may be suitable for performing the method of this invention. It is understood that various other elements or apparatus may be substituted for those shown in the drawing within the scope of this invention.

Referring to the drawing, a reaction vessel or chamber 10 is connected to an inert gas supply 12 through valve 14. The inert gas is fed to the bottom of reaction vessel 10 by tubing 16. Reaction vessel 10 is also connected to a conventional condenser including tubing 18 and distillate receiver 20 and to a suitable vacuum pump 22 through valve 23, receiver 20 and tubing 18. Vessel 10 may be heated by a suitable heating means 24 such as an electric mantle.

In performing this invention, an elastomer from which filler is to be recovered, and which is preferably minced or ground into small pieces which are generally larger than the filler particles, is mixed with a suitable plasticizer in reaction vessel 10. Vessel 10 is closed and preferably evacuated by vacuum pump 22 to a suitable negative pressure. Inert gas is bled into vessel 10 to agitate the degradative mixture and to purge the vessel's atmosphere. If it is desired, further mixture agitation can be provided by suitable stirring means connected to the interior of vessel 10 in a conventional manner. The mixture is then heated by heating means 24 to a suitable temperature (e.g. at least about 275° C. but somewhat higher may be employed if it is desired to hasten the process) which decomposes and evaporates the elastomer without distilling away any substantial portion of the plasticizer. When the elastomer has been decomposed and substantially distilled (or partially distilled depending on the elastomer) from vessel 10 to receiver 20, the reaction mixture is cooled to below the reaction temperature of the filler with air, preferably to about room temperature, and the inert gas supply and vacuum pump disconnected. The residue or filler is then separated from the supernatant surface by settlement, centrifugation or other conventional separation method or combination thereof. The residue may then be washed with a suitable solvent or solvents miscible with the elastomer and the plasticizer to remove any residual elastomer or plasticizer. The residue is washed with an alcohol to remove the solvent. After the last alcohol wash, the remaining residue is stirred with a suitable base or acid or combination thereof depending on the elastomer being decomposed and allowed to stand for a period of time to remove any remaining impurities. The liquid is decanted and the residue washed again with alcohol and dried. The remaining residue is the filler material in its pure, unreacted state.

The plasticizer used with this invention should have a low vapor pressure and should maintain low viscosity and stability at elevated operating temperatures. Generally, the plasticizer should be a high boiling plasticizer which boils at a temperature above 325° such as a partially hydrogenated terphenyl plasticizer, for example such as sold by Monsanta Company as HB–40, or a silicone oil.

The temperature at which the elastomer and plasticizer mixture is heated depends on the temperature required to decompose and distill the elastomer without boiling and distilling any substantial portion of the plasticizer. The time required to heat the mixture is dependent upon the particular elastomer being decomposed and the heating temperature.

The vacuum aids in distillation as well as controls the atmosphere over the reaction mixture and is chosen accordingly. The vacuum also removes any gaseous decomposition products from the reaction chamber. Any additives to the atmosphere in the reaction vessel, such as an inert gas like nitrogen, are determined by their reactivity with the materials in the mixture.

The solvents used with the first wash of this invention are selected based on their miscibility with the decomposed elastomer and with the plasticizer. The solvents used in the subsequent washes are selected based on their dissolution of the previous solvent or solvents and their volatility at room temperature.

The residue or filler may be separated from the supernatant liquid or any of the solvent washes by any common separating means such as settling or centrifugation in a manner well known in the art.

EXAMPLE 1

Boron filled silicone elastomer scrap (900 grams), which was ground into particles about 1.5 millimeters in size, was placed in a 12 liter reaction vessel as shown in the drawing and mixed with 7 liters of HB-40 plasticizer and heated to about 300–310° C. under 8 inches of vacuum while dry nitrogen gas was slowly bled into the vessel to agitate the degradative mixture. When about 3 liters of distillate had been collected in the receiver, after about 2 hours, and the elastomer decomposed, heating was stopped and the mixture cooled to about 200–210° C. The vessel was opened to the atmosphere and the nitrogen turned off. The reaction vessel was allowed to stand until the filler settled to the bottom. The liquid was removed and run through a centrifuge to remove any suspended filler. The residue was washed with xylene and the xylene removed by centrifugation. Xylene washes were repeated until the supernatant wash liquid was colorless. The residue was then washed repeatedly with ethanol to remove the xylene. After the last alcohol wash, the material was stirred with either a 3 normal hydrochloric acid or a base depending on the elastomer to remove any additional impurities or elastomer and the mixture centrifuged. The filler was given a final wash with water and dried. The recovered filler weighed 331 grams and contained 91.4 percent by weight total boron.

Silicone elastomers have a generic formula of $R(SiO_2)_n$ R wherein R designates the organic molecules and $n$ designates the number of siloxy molecules in the polymer. Silicones which can be decomposed by this method may be crosslinked with compounds such as tin octonate.

EXAMPLE 2

Boron filled polychloroprene elastomer scrap (200 grams), which was ground into particles about 1.5 millimeters in size, was mixed with 3.5 liters of HB-40 plasticizer in a 5 liter reaction vessel as shown in the drawing with a mechanical stirrer inserted in the vessel. The mixture was heated and stirred at 300–310° C. for two hours so that the elastomer decomposed and was distilled off at atmospheric pressure while dry nitrogen was bled into the vessel. The reaction mixture was then cooled to about 100° C., the vessel opened to the atmosphere and nitrogen turned off. The residue was isolated from the supernatant liquid by centrifugation and washed 3 times with chloroform and twice with alcohol. The filler was then stirred into a mixture of alcohol and hydrochloric acid to remove the remaining impurities. The liquid was decanted and the residue washed twice with alcohol and dried. The recovered filler weighed 114 grams and contained 91.9 percent total boron by weight.

It will be understood that various changes in the details, materials and steps, which have been herein described and illustrated in order to explain the nature of the invention, may be made by those skilled in the art within the principles and scope of the invention as expressed in the appended claims.

What is claimed is:

1. A method for recovering a filler material useful in nuclear reactor shielding from a filled elastomer matrix, comprising finely dividing said filled elastomer, mixing said finely divided filled elastomer with a high boiling organic plasticizer, heating the mixture while in an inert atmosphere to a temperature above the decomposition temperature of the elastomer at least about 275° C., agitating said mixture while maintaining said temperature until the elastomer decomposes, cooling the reaction mixture while in the inert atmosphere and separating the filler material from the reaction mixture.

2. The method of claim 1 including the step of repeatedly washing said residue with xylene and then repeatedly washing said residue with alcohol.

3. The method of claim 1 wherein said mixture is heated to a temperature above the decomposition temperature of said elastomer, but below the boiling point of the plasticizer.

4. The method of claim 1 wherein said filler material is boron and said elastomer is silicone.

5. The method of claim 4 wherein said plasticizer is a partially hydrogenated terphenyl plasticizer.

6. The method of claim 5 wherein said mixture is heated to a temperature of about 300° C.

7. The method of claim 1 wherein said filler material is boron and said elastomer is polychloroprene.

8. The method of claim 7 wherein said plasticizer is a partially hydrogenated terphenyl plasticizer.

9. The method of claim 8 wherein said mixture is heated to a temperature of about 300° C.

References Cited

UNITED STATES PATENTS

| | | | |
|---|---|---|---|
| 2,854,490 | 9/1958 | Fischer | 260—96 X |
| 3,202,647 | 8/1965 | Todd | 159—47 X |
| 3,234,994 | 2/1966 | Dance | 159—47 |
| 3,234,995 | 2/1966 | Van den Berg | 159—47 |
| 3,257,372 | 6/1966 | Moon | 159—47 X |
| 3,356,618 | 12/1967 | Rich | 176—93 X |
| 3,424,563 | 1/1969 | Grinstead | 23—59 X |

FOREIGN PATENTS 581,279  10/1946  Great Britain.

OTHER REFERENCES

Delmonte, Metal-Filled Plastics, Reinhold Pub. Co., New York, 1961, pp. 96, 97, 201, 205, 206.

Madorsky, Thermal Degradation of Organic Polymers, S.P.E. Journal, July 1961, pp. 665 to 671.

NORMAN YUDKOFF, Primary Examiner

S. J. EMERY, Assistant Examiner

U.S. Cl. X.R.

23—209, 306; 159—47; 176—93; 260—41.5